Patented Aug. 19, 1941

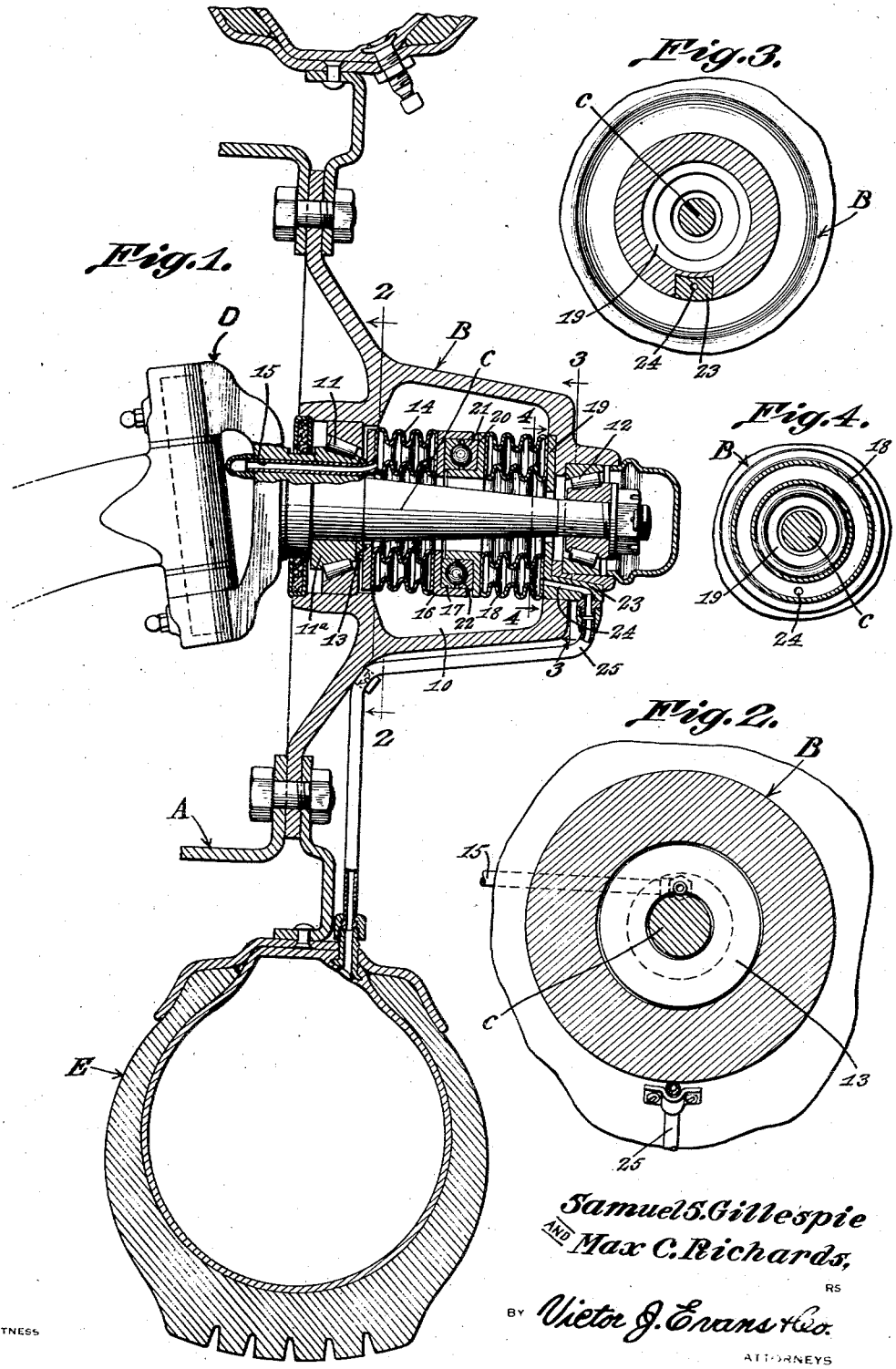

2,253,118

UNITED STATES PATENT OFFICE 2,253,118

PNEUMATIC CONNECTION

Samuel S. Gillespie and Max C. Richards, Globe, Ariz.

Application April 23, 1940, Serial No. 331,243

2 Claims. (Cl. 73—31)

This invention relates to improvements in pneumatic connectors and especially is concerned with a connector useful in coupling a pneumatic device carried upon a rotating member such as a wheel with a stationary pneumatic device preferably associated with the axle upon which the wheel is mounted.

It has frequently been desirable in the past to provide means for pneumatically coupling devices mounted upon wheels with stationary pneumatic devices. For instance, it often is desirable to have a visual indication on the dashboard of a vehicle of fluid pressure within the vehicle tires, particularly with heavy vehicles comprising a drawing section and a trailer such as commonly is used for vehicular transportation of freight. The importance of providing this indication on the vehicle dashboard will be obvious: it precludes a possibility of the vehicle driver being unaware of a leak or puncture of one of the tires.

It is an object of this invention to provide a pneumatic coupling permitting operation of a remote indicator located for instance on the vehicle dashboard connected with the vehicle tires in a manner such that changes of fluid pressure within the tires causes operation of the indicator.

An advantage of the novel pneumatic coupling according to this invention is that it can be adapted to use with existing types of axle-wheel structures without necessitating extensive or costly reorganization and without requiring the use of specialized tools.

Noteworthy among the features of the novel connector according to the present invention are its simplicity and ruggedness of construction, the former suiting the device to the requirements of manufacture under conditions of mass production and the latter assuring long useful life.

Other objects, advantages and features of the new and improved connector according to the present invention will be apparent to those skilled in this art during the course of the following description.

Regarded in certain of its broader aspects a novel pneumatic connection according to this invention comprises a first axially extensible and contractible annular bellows rigidly mounted at one end upon and within the hollow hub of a rotating member such as a wheel, a thrust bearing mounted on the free end of the bellows concentric the axis of rotation of the hub, an oppositely acting similar bellows within the hub mounted on parts of the axle carrying on its free end a bearing race and balls pressing against and cooperating with the race on the first bellows whereby expansion of one bellows causes contraction of the other bellows and vice versa, and pneumatic connections to each of said bellows.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Referring then to the drawing—

Figure 1 is essentially a vertical sectional view of the presently preferred embodiment of this invention showing the same applied to the coupling of a pneumatic tire on a wheel with a pneumatic line on a vehicle chassis, and Figs. 2, 3 and 4 are each transverse vertical sectional views of the device illustrated in Fig. 1 taken along the planes indicated by the lines 2—2, 3—3 and 4—4 respectively.

Referring now to the figures of the drawing wherein the preferred embodiment of this invention is shown in detail, it will be noticed that a wheel generally designated by the reference character A mounted upon a hub B is received upon a stub axle connected to parts D of a conventional vehicle chassis. The hub B is hollow providing a chamber 10 extending between the cone bearings 11 and 12 by means of which the wheel is rotatably mounted upon the axle. An annulus 13 mounted upon parts of the inner race 11a of the bearing 11 extends concentric the axis of the shaft C and presents a face toward the chamber 10 in the hub B essentially as shown. An axially extensible and contractible first annular bellows 14 mounted upon the annulus 13 communicates through a pneumatic connection 15 with a stationary pneumatic device (not shown) mounted on parts of the vehicle chassis. It is to be understood that the bellows and annulus are rigidly mounted with respect to the axle and positioned concentric the axis thereof. A cup-shaped member 16 mounted on the distal free end of the first bellows 14 receives a thrust bearing race 17 for reasons hereinafter to be explained.

A second axially extensible and contractible annular bellows 18 mounted on a collar 19 fitted into parts of and rotatable with the hub B carries on its distal free end a flanged sleeve 20 on which is mounted a thrust bearing race 21 and balls 22 are positioned between the thrust bearing races 17 and 21 whereby movement may be transferred from one of the bellows 14 and 18 to the other. It is to be understood that the bellows are adjusted in a manner such that the free ends continuously press the thrust bearing whereby expansion of one bellows causes contraction of the other bellows and vice versa.

A key-like element 23 having a passage 24 extending therethrough is formed integral with the member 19 and the passage 24 communicates at one end with the interior of the bellows 18 and at its opposite end with a pneumatic connection 25 leading to the interior of a tire E mounted on the wheel A in a manner conventional in this art.

It will be apparent from the foregoing that the bellows 18 is pneumatically connected to the interior of the tire E and hence the pressure of fluid within the bellows is equal to the pressure of fluid within the tire and because of qualities characteristic of this type of bellows the axial length thereof is proportional to the fluid pressure therein. For reasons pointed out above changes in length of the bellows 18 are reflected in changes in length of the bellows 14. Accordingly a change of fluid pressure within the tire E results in change of fluid pressure in the pneumatic connection 15 thus permitting operation of an indicator located remotely from the wheel. As will be apparent to those skilled in this art, an indicator so connected will function irrespective of rotation of the wheel inasmuch as the bellows 14 remain stationary and the bellows 18 rotates, both bellows being positioned of course with their axes coincident the axis of rotation of the wheel.

It is to be understood that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. In combination with an axle and a hollow hub rotatably mounted thereon, the improved means for coupling a first pneumatic device on the hub with a second pneumatic device on the axle comprising a first axially extensible and contractible annular bellows rigidly mounted at one end upon and within the hub and with its free end extending concentric the axis of rotation of the hub; a thrust bearing race mounted on the face of the free end of said first bellows; a second axially extensible and contractible annular bellows within the hub mounted at one end upon parts of and concentric to the axle; a thrust bearing race and balls mounted on the distal free end of the second bellows cooperating with and pressing against the race on the first bellows whereby expansion of one bellows causes contraction of the other bellows and vice versa; and a pneumatic connection to each of said bellows.

2. In combination with an axle and a hollow hub rotatably mounted thereon, the improved means for coupling a first pneumatic device on the hub with a second pneumatic device on the axle, comprising a first axially extensible and contractible annular bellows rigidly mounted at one end upon and within the hub and its free end extending concentric with the axis of rotation of the hub, a ring-like member rigidly carried on the face of the free end of the bellows and having a laterally extending flange at its outer periphery, a second axially extensible and contractible annular bellows within the hub mounted at one end upon part of and concentric to the axle, a ring-like member mounted rigidly on the distal free end of the second bellows and having an annular flange at its inner periphery adapted to engage the ring-like member of the other bellows and to be engaged by the annular flange of the other bellows, and ball races removably contained within the annular housing formed by the two ring-like members and their flanges.

SAMUEL S. GILLESPIE.
MAX C. RICHARDS.